(12) United States Patent
Chu

(10) Patent No.: US 7,976,179 B2
(45) Date of Patent: Jul. 12, 2011

(54) SOLAR-LAMP ASSEMBLY

(75) Inventor: Ko-Chien Chu, Taoyuan Hsien (TW)

(73) Assignee: System Photovoltaic Science Co., Ltd., Taoyuan Hsien (TW)

( * ) Notice: Subject to any disclaimer, the term of this patent is extended or adjusted under 35 U.S.C. 154(b) by 126 days.

(21) Appl. No.: 12/477,837

(22) Filed: Jun. 3, 2009

(65) Prior Publication Data
US 2010/0309653 A1   Dec. 9, 2010

(51) Int. Cl.
*F21L 13/00* (2006.01)
(52) U.S. Cl. .................... 362/183; 362/20; 362/243
(58) Field of Classification Search .......... 362/20, 362/159, 183, 184, 191, 227, 235, 240, 243, 362/247, 249.01, 249.02, 249.05, 260, 265, 362/266, 276, 278, 431, 800, 812
See application file for complete search history.

(56) References Cited

U.S. PATENT DOCUMENTS

| | | | | |
|---|---|---|---|---|
| 5,101,329 A * | 3/1992 | Doyle | | 362/183 |
| 6,784,357 B1 * | 8/2004 | Wang | | 136/244 |
| 6,942,361 B1 * | 9/2005 | Kishimura et al. | | 362/240 |
| 7,231,735 B2 * | 6/2007 | Gelbert | | 40/541 |
| 7,278,761 B2 * | 10/2007 | Kuan | | 362/294 |
| 7,422,348 B1 * | 9/2008 | Yates, II | | 362/364 |
| 7,585,085 B1 * | 9/2009 | Holman | | 362/183 |
| 2006/0050528 A1 * | 3/2006 | Lyons et al. | | 362/559 |
| 2006/0250803 A1 * | 11/2006 | Chen | | 362/373 |
| 2007/0070628 A1 * | 3/2007 | Chen | | 362/249 |
| 2008/0137327 A1 * | 6/2008 | Hodulik | | 362/183 |
| 2008/0298051 A1 * | 12/2008 | Chu | | 362/183 |

* cited by examiner

*Primary Examiner* — Hargobind S Sawhney
(74) *Attorney, Agent, or Firm* — Pro-Techtor Int'l Services; Ralph Willgohs

(57) ABSTRACT

A solar-lamp assembly includes a main frame, a secondary frame mounted atop the main frame and having solar wafers and a photoelectric-transducing-and-controlling element; a housing attached below the main frame for accommodating therein a battery; a post connected below the housing; at least one electrically interconnected lamp element connected below the main frame by a respective lamp shade and including therein at least one lighting device, wherein the battery, the lamp element, and the photoelectric-transducing-and-controlling element are electrically connected; a flexible board provided between the lamp element and the main frame, wherein the flexible board allows a plurality of the lamp elements to project light in different directions; and at least an arm-shaped lamp supporter connected with one lateral of the housing and having at least one lamp element affixed thereto through another flexible board.

4 Claims, 5 Drawing Sheets

SOLAR-LAMP ASSEMBLY

BACKGROUND OF THE INVENTION

1. Technical Field

The present invention relates to post lamps and, more particularly, to a lamp assembly that has a post structure and is powered by solar energy.

2. Description of Related Art

With the progress of time, popularization of electric appliances, and increasing significance of computers in our daily life, it may be said that the modern time is a time without nights. In this nightless time, lighting serves not only for illumination, but also for decoration and landscaping. However, petroleum energy, currently the main source of power, is inherently limited and decreasing along human squander. Thus, solar power, as the most inexpensive, inexhaustible, sustainable energy, has received people's close attention and various applications thereof have been developed. Many known solar lamps are produced under this circumstance. Conventionally, in solar applications, a solar panel, which is constructed from wafers, serves to convert solar energy into electric power with a transduction rate ranging between 12% and 17%. Under this principle, streetlamps or landscape lamps, which consume less power and only operate in nighttime, can efficiently and economically provide illumination after sufficient absorption of the solar energy for whole day long. In view of this advantage, manifold solar lamps have been developed and introduced to the market by related manufacturers. Nevertheless, defects do exist in the known solar lamps. For example, some known solar lamps that are based on normal lamps would compromise on durability for the sake of higher illumination. Some other known solar lamps would have separate solar panels and lighting devices. This kind of solar lamps thus add difficulty in manufacture and cause inharmonic landscape. Besides, since each of these separate solar panels is solely configured for a specific lamp structure and is not suitable for other lamp structures, the conventional solar panels are too inflexible to meet different applications. In view of the foregoing defects that significantly limit the applicability and adaptability of solar lamps, there is a need existing for improving the conventional solar lamps.

SUMMARY OF THE INVENTION

The primary objective of the present invention is to provide a solar-lamp assembly that is powered by solar energy and has a flexible board for properly positioning lamp elements of the solar-lamp assembly so that the solar-lamp assembly is able to provide illumination in multiple light projecting directions. As a result, the disclosed solar-lamp assembly has enhanced illuminating scope and thus has improved applicability when implemented as a landscape lamp or a streetlamp.

To achieve the above and other objectives of the present invention, the solar-lamp assembly comprises a main frame, a secondary frame mounted on an upper surface of the main frame, wherein the secondary frame has its upper surface provided with a plurality of solar wafers and encloses therein a photoelectric-transducing-and-controlling element; a housing attached to a lower surface of the main frame for accommodating a battery; a post connected to a bottom of the housing; at least one electrically interconnected lamp element connected below the main frame by a lamp shade and including therein at least one lighting device, wherein the battery, the lamp element, and the photoelectric-transducing-and-controlling element are electrically connected; a flexible board provided between the lamp element and the main frame, wherein the flexible board is generally in a U shape with two edges thereof fixed to the main frame so that the flexible board is so posed to have a horizontal bottom and two tilted surfaces flanking the horizontal bottom for allowing a plurality of the lamp elements to project light along different directions as needed; and at least an arm-shaped lamp supporter connected with one lateral of the housing, wherein the lamp supporter has at least one lamp element affixed thereto through another flexible board.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE PREFERRED EMBODIMENT

Figure 1:
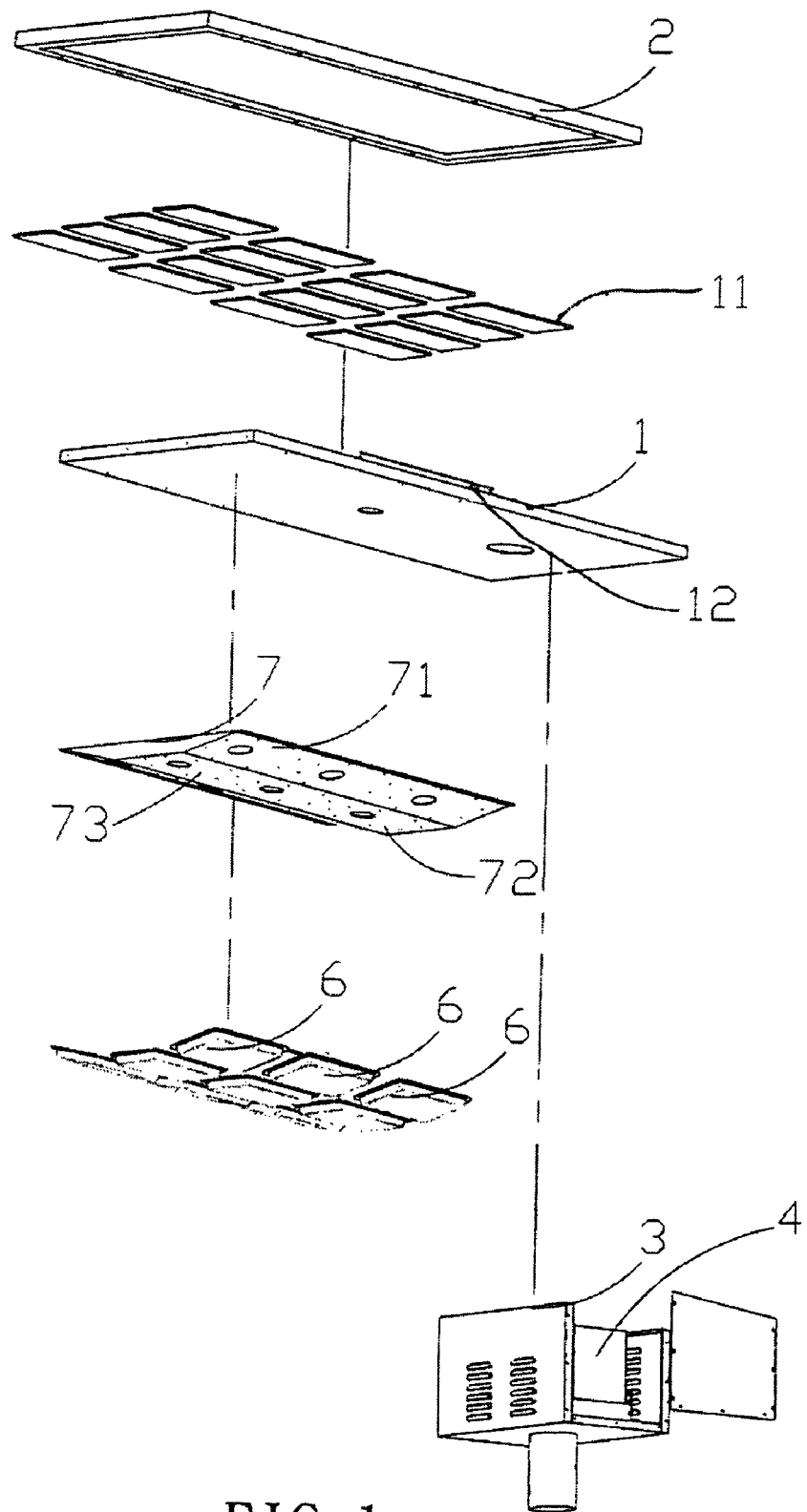
FIG. 1 is an exploded view of a solar-lamp assembly of the present invention.
Figure 2:
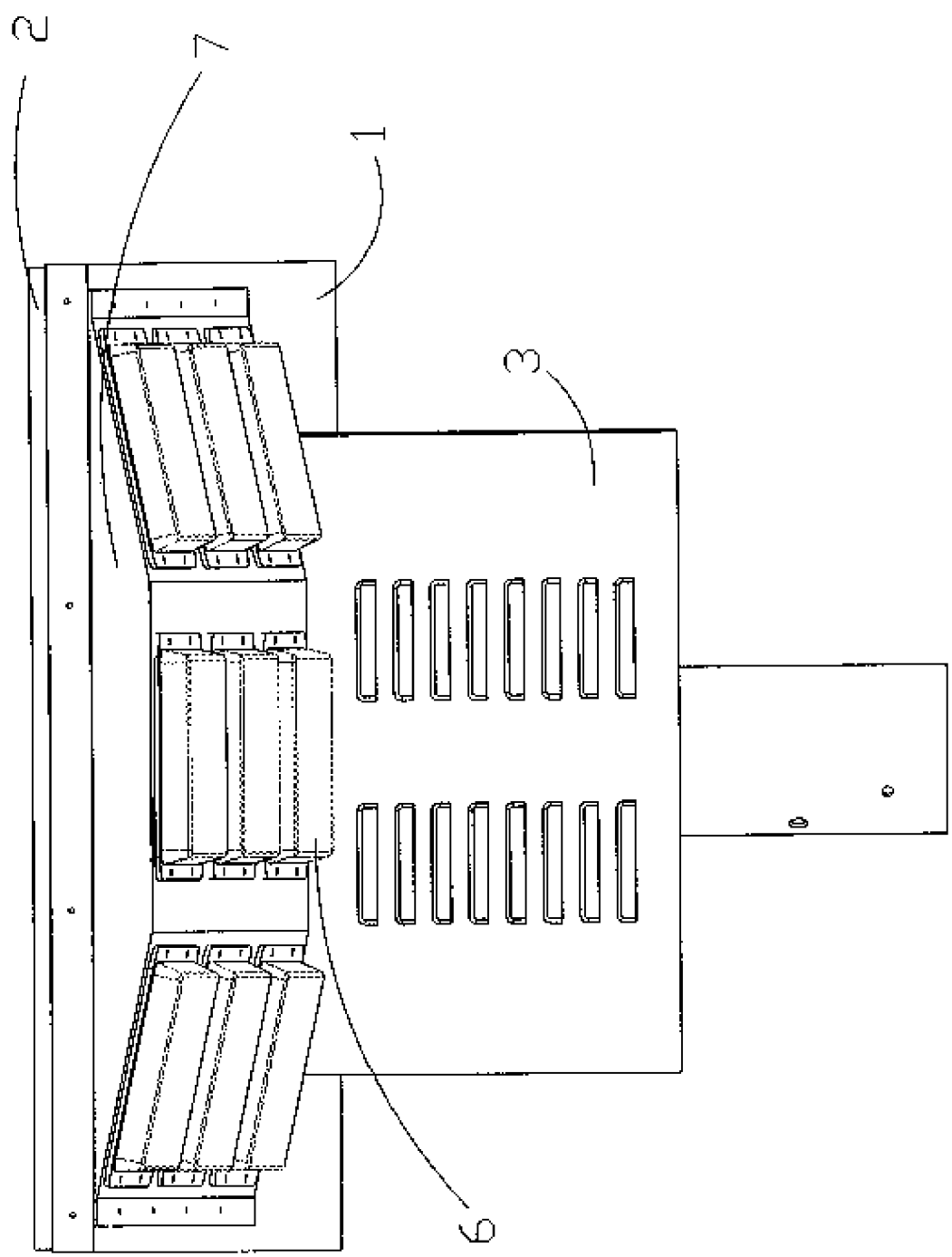
FIG. 2 is a front view of the solar-lamp assembly of the present invention.

Please refer to FIGS. 1 through 5 for a solar-lamp assembly disclosed by the present invention. The basic form of the solar-lamp assembly, as shown in FIGS. 1 through 4, comprises a main frame platform 1 and a frame body 2 mounted on an upper surface of the main frame platform 1. The frame body 2 has its upper surface provided with a plurality of solar wafers 11 and encloses therein a photoelectric-transducing-and-controlling element 12, which might be, for example, a circuit board, as illustrated in FIG. 1, having a voltage transducer and a controller.

Figure 3:
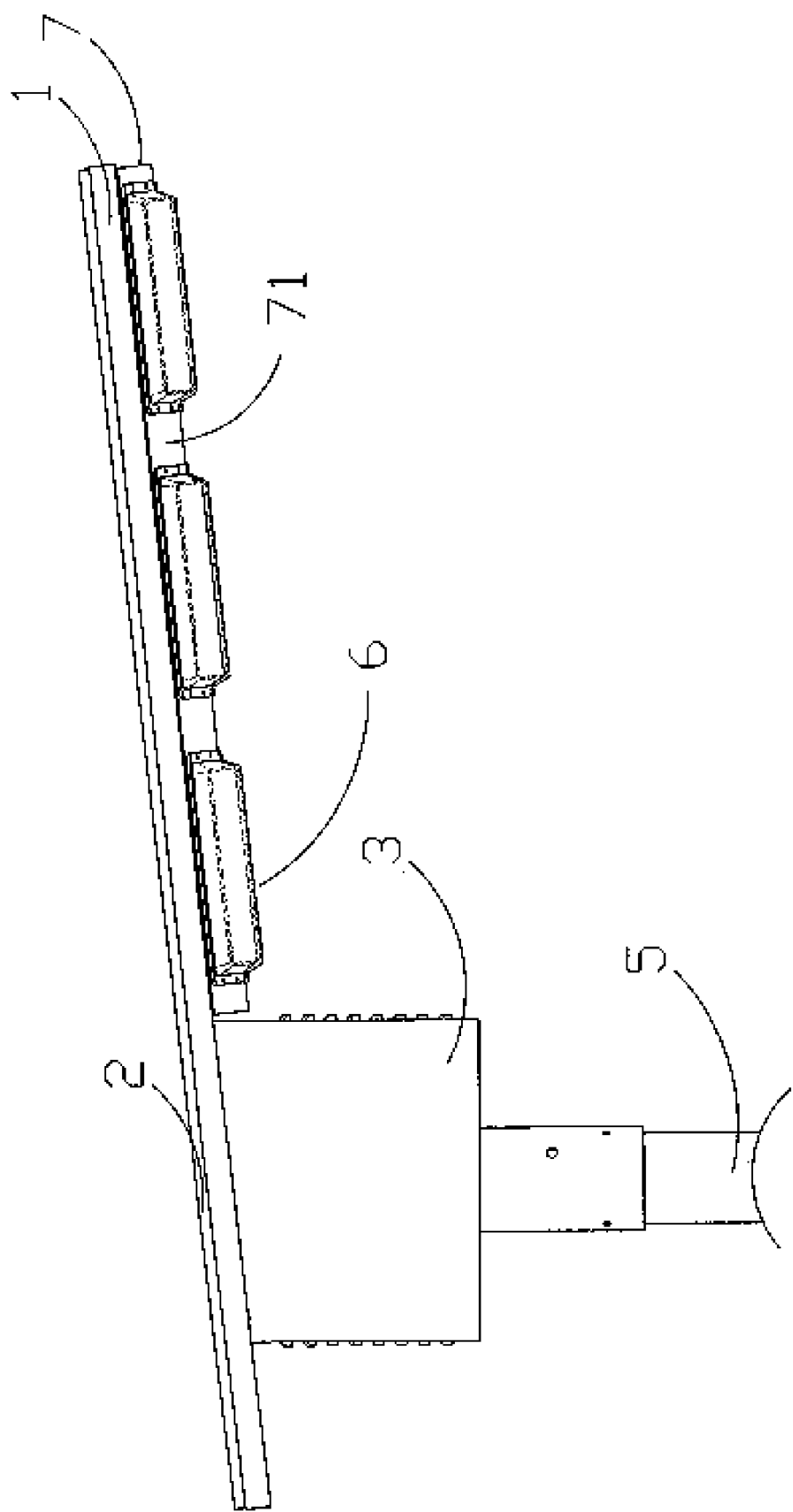
FIG. 3 is a lateral view of the solar-lamp assembly of the present invention.
Figure 4:
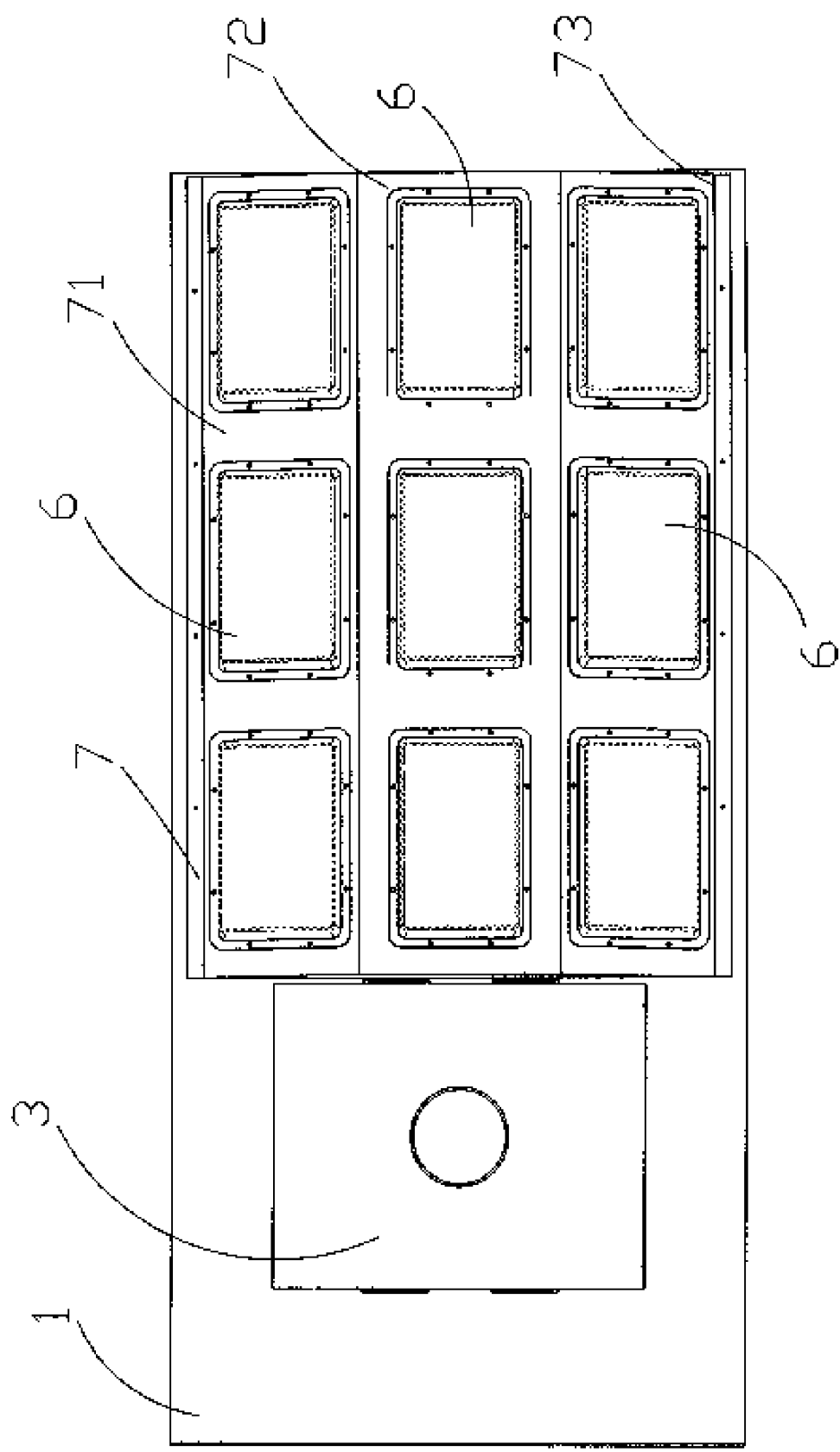
FIG. 4 is a bottom view of the solar-lamp assembly of the present invention.

Although both the solar wafers 11 and the photoelectric-transducing-and-controlling element 12 are not shown in detail in the drawings, people skilled in the art would appreciate the necessary essentials for photoelectric transduction. A housing 3 attached to a lower surface of the main frame platform 1 is hollow for accommodating a battery 4. A post 5 to be fixed to the ground may directly support below the housing 3 or may be connected with the housing 3 by means of a sleeve, as shown in FIG. 3. At least one electrically interconnected lamp element 6 is deposited below the frame 1 and includes at least one lighting device therein (not shown). The lighting device of the lamp element 6 may be a light-emitting diode, a fluorescent tube, or a bulb. The components are such configured that the battery 4, the lamp element 6, and the photoelectric-transducing-and-controlling element are electrically connected. In the present embodiment, plural said lamp elements 6 are electrically interconnected and each of them is affixed to the main frame platform 1 by a respective lamp shade. A flexible board 7 is provided between the lamp elements 6 and the main frame platform 1. In the present embodiment, the flexible board 7 is generally in a U shape with two edges thereof fixed to the main frame platform 1 so that the flexible board 7 is posed to have a horizontal bottom 72 and two outward tilted surfaces 71, 73 flanking the horizontal bottom 72. The aforementioned lamp elements 6 are installed onto the bottom 72 and the tilted surfaces 71, 73 according to practical needs. The bottom 72 and the tilted surfaces 73 thus allow a plurality of the lamp elements 6 to project light in different directions as needed. As can be seen in FIG. 4, the flexible board 7 includes nine regions that are composed of three rows and three columns of tilted surfaces and the flexible board 7 has the tilted surfaces tilted rightward and leftward. However, in another embodiment of the present invention, the flexible board 7 may have the tilted surfaces facing forward and rearward. Alternatively, in a further embodiment of the present invention, all the eight peripheral tilted surfaces can be tilted differently, i.e. independently. In other words, the different tilted surfaces may be independently positioned at proper angles of tilt to face the front and the rear, the right and the left, or any combination of the directions as needed.

Figure 5:
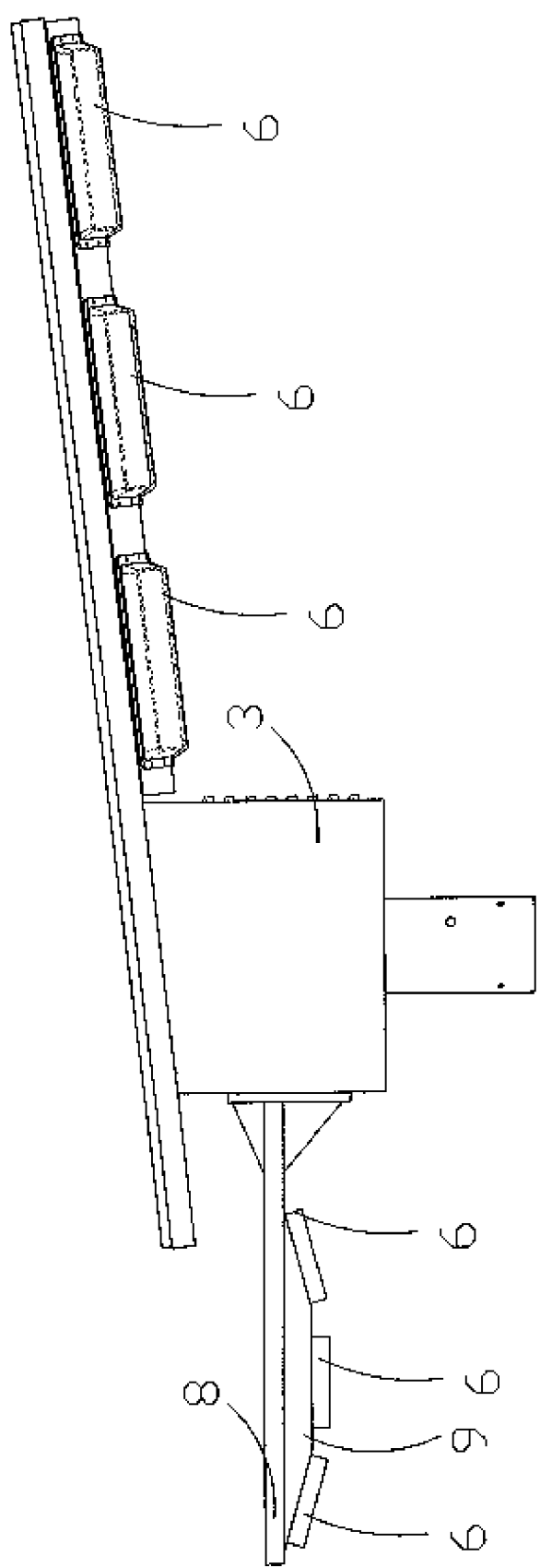
FIG. 5 shows the solar-lamp assembly of the present invention incorporating a supporter.

Referring to FIG. 5, at least one lamp supporter 8, shaped as an arm, is further provided to connect with any lateral of the housing 3. The lamp supporter 8 has at least one lamp element 6 affixed thereto by means of another flexible board 9. Therein, the flexible board 9 on the lamp supporter 8 has its tilted surfaces tilted forward and rearward.

Thereby, the flexible boards, functioning as intermediates, allow the lamp elements thereon to be independently positioned at desired angles of tilt so that the illuminating scope of the light emitted by the lighting devices of the lamp elements can be enlarged. To sum up, the solar-lamp assembly of the present invention is superior to the conventional solar lamps in both lighting efficiency and applicability.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modulations which do riot depart from the concept of the present invention should be encompassed by this appended claims.

What is claimed is:

1. A solar-lamp assembly, comprising:
   a main frame platform;
   a frame body attached to an upper surface of the main frame platform, wherein the frame body has an upper surface provided with a plurality of solar wafers and encloses therein a photoelectric-transducing-and-controlling element;
   a housing attached to a lower surface of the main frame platform, wherein the housing is hollow for accommodating therein a battery;
   a post connected to a bottom of the housing;
   at least one electrically interconnected lamp element connected below the main frame platform by a respective lamp shade and including at least one lighting device therein, wherein the battery, the lamp element and the photoelectric-transducing-and-controlling element are electrically connected; and
   a flexible board provided between the lamp element and the main frame platform, wherein the flexible board is generally in a U shape with two edges thereof fixed to the main frame platform so that the flexible board is posed to have a horizontal bottom and two tilted surfaces flanking the horizontal bottom, wherein the bottom and the tilted surfaces allow a plurality of the lamp elements to project light in different directions as needed.

2. The solar-lamp assembly of claim 1, wherein at least an arm-shaped lamp supporter is connected with one lateral of the housing and the lamp supporter has at least one lamp element affixed thereto by means of another flexible board.

3. The solar-lamp assembly of claim 1, wherein the lighting device is a light-emitting diode, a fluorescent tube, or a bulb.

4. The solar-lamp assembly of claim 1, wherein the flexible board comprises a plurality of tilted surfaces which are each independently positionable at desired angles of tilt to face the front and the rear, the right and the left, or any combination thereof.

\* \* \* \* \*